United States Patent [19]

Hume et al.

[11] Patent Number: 5,492,467
[45] Date of Patent: Feb. 20, 1996

[54] APPARATUS FOR INJECTION MOLDING ARTICLES OF AMORPHOUS POLYETHYLENE TEREPHTHALATE

[75] Inventors: William J. Hume, Amesbury; Paul M. Swenson, S. Hamilton, both of Mass.

[73] Assignee: Kona Corporation, Gloucester, Mass.

[21] Appl. No.: 175,617

[22] Filed: Dec. 30, 1993

[51] Int. Cl.⁶ .................................................. B29C 45/20
[52] U.S. Cl. ........................ 425/549; 264/328.15; 425/556
[58] Field of Search ...................................... 425/549, 556; 264/328.15

[56] References Cited

U.S. PATENT DOCUMENTS

| 3,137,904 | 6/1964 | Steinman et al. | 425/549 |
| 4,386,262 | 5/1983 | Gellert | 425/549 |
| 5,051,086 | 9/1991 | Gellert | 425/549 |
| 5,139,724 | 8/1992 | Hofstetter et al. | 425/549 |
| 5,268,184 | 12/1993 | Gellert | 425/549 |

OTHER PUBLICATIONS

"Krupp Taps Worldwide Interest in Bottlemaking", Plastics Machinery and Equipment, Nov. 1993, p. 8.
Brochure of Krupp Formaplast Maschinenbrau GmbH entitled "Information Mar. 1991—Valveless Injection Molds".
Brochure of Krupp Formaplast Maschinenbrau, GmbH entitled "PET–O–MAT Injection Molding Systems".

Primary Examiner—Tim Heitbrink
Attorney, Agent, or Firm—Pandiscio & Pandiscio

[57] ABSTRACT

A system and apparatus for injection molding articles of crystallizable polymeric materials in a substantially completely amorphous state is provided. The system includes (i) a mold defining an article formation cavity and an outer cavity connected by a gate, (ii) a melt transport mechanism including a bushing having a distal portion located in the outer cavity in close proximity to the gate inlet, and (iii) a source of molten material. The geometric configurations of the distal portion of the bushing, the inner portion of the outer cavity and the gate, and the relative locations of the distal end of the bushing and the inlet of the gate are each selected such that melt material may flow from the source through the melt transport mechanism and gate into the article formation cavity. The melt transport mechanism is maintained at a temperature above the characteristic crystal melt temperature of the polymeric material. The mold temperature is maintained well below the minimum characteristic glass transition temperature of the polymeric material. Further, the geometric configuration of the elements is selected such that the vestige which protrudes from the completed article has a minimum length, and such that during the interval between successive cycles only a small volume of melt located between the discharge orifice of the bushing and the outlet of the gate is allowed to crystallize.

9 Claims, 9 Drawing Sheets

APPARATUS FOR INJECTION MOLDING ARTICLES OF AMORPHOUS POLYETHYLENE TEREPHTHALATE

BACKGROUND

1. Field of Invention

This invention relates generally to injection molding systems and apparatus. More particularly, the invention relates to systems and apparatus specifically adapted for injection molding articles of substantially amorphous polyethylene terephthalate and similar materials.

2. Summary of the Prior Art

The use of polyethylene terephthalate (hereinafter referred to as "PET") and similar materials as the materials of choice in the formation of numerous injection molded articles is well known in the art. For example, in the bottle and container industry, the blow molding of injection molded PET preforms has gained wide acceptance, and is experiencing strong growth. Among the reasons for this is the fact that PET and similar materials offer a wide range of desirable properties. Specifically, PET materials generally evidence high strength, good clarity, and low gas permeation characteristics. Further, PET materials are comparatively easy to recycle. Accordingly, they are desirable for use in retail packaging applications.

PET and similar materials, however, present molders with significant processing problems. These problems may be at least partially explained by the fact that these materials are considered to be what is known in the art as "crystallizable" materials. By this it is meant that the randomly oriented polymer chains of the amorphous phase of the material may be caused to form a highly ordered, crystalline structure in a controllable manner. This may be accomplished either by mechanical stretching of the material so as to cause an ordered orientation of its molecules and the formation of stress induced crystals, or by controlling the temperature of the material over time in a manner which induces crystal formation and growth. More particularly, as the temperature of the material is increased from the ambient, the material passes through a number of states. Specifically, the material in its so-called "glassy" (or rigid) state at ambient temperature upon heating will sequentially pass through a glass transition temperature range, a crystallization temperature range, and a crystal melting temperature range, before it reaches its molten state.

In the glassy state, existing crystals in the material are stable, and additional crystals cannot form because the molecules are too sluggish. This is to say that the molecules of the material lack the requisite energy to move about sufficiently to induce the creation of the intermolecular bonds necessary for crystal formation. In the glass transition temperature range (which for PET is typically between about 175° F. and about 185° F.), the material transforms from its glassy state to a rubbery state.

In the rubbery state, crystals tend to form and grow. The rate of this crystal formation and growth is both time and temperature dependent. More particularly, the rate of crystal formation and growth follows a substantially parabolic curve on a temperature versus time graph. It, therefore, will be recognized by those skilled in the art that for PET materials the rate of crystal formation and growth typically increases with temperature from about 185° F. up to about 350° F., and thereafter decreases to substantially zero at about 480° F. Further, the extent of crystal formation and growth depends significantly upon the length of time during which the material is permitted to reside at any given temperature within its crystallization temperature range.

The crystal melting temperature range for PET extends between about 480° F. and about 490° F. Above about 490° F., the material exists in its molten state.

It is to be understood that the foregoing is a generalization of the crystallization properties of PET and similar materials. Variations in the properties of the particular material under consideration (such as its intrinsic viscosity, its diethylene glycol content, its water content and/or its comonomer or other additive content) may alter the melting point of the material, the crystallization behavior of the material, or both.

Furthermore, the breakdown product acetaldehyde is known to be generated in significant amounts whenever PET material is in a molten state. It is also well understood that slight changes in the melt temperature will significantly effect the rate of acetaldehyde generation. Since acetaldehyde is a potent flavorant, its presence in the melt material must be minimized during the injection molding of food or drink containers (or preforms therefor). If this is not done, detectable changes in the flavor or aroma of foods packaged in such articles (or in containers made from such preforms) may be induced. Heretofore, acetaldehyde minimization has been accomplished by maintaining the melt temperature as low as possible, while still allowing substantially clear articles (or preforms therefor) to be formed by so-called "runnerless" injection molding apparatus.

Injection molded preforms adapted for subsequent blow molding into a finally desired container form should consist of mostly amorphous material. This permits the preform to be blow molded into a desired shape easily and with a minimum of reheating. It also avoids the formation of undesireable cracks or a whitish haziness in the finished article/preform caused by the presence of excessive crystallized material therein. Further, the article/preform should have an acceptable acetaldehyde level, and be free from contaminants or defects.

In the molding of a preform in a "runnerless" injection molding process, therefore, the material temperature is invariably maintained above the minimum temperature required to maintain the material in its molten state prior to, and during, injection. Thereafter, the material is rapidly cooled in the article formation cavity of the mold to a temperature substantially below its minimum glassy phase transition temperature. This minimizes the time during which the material is at a temperature within its characteristic crystal formation temperature range, and consequently minimizes the crystal content of the finished article/preform.

A representative PET container formation process includes the steps of:

(i) injection molding a closed bottom preform;

(ii) reheating the preform to the blow molding temperature (normally about 18° F. to 36° F. above the glass transition temperature range of the preform material);

(iii) stretching the preform axially in the blow mold by means of a stretch rod; and (iv) simultaneously with the axial stretching, introducing compressed air into the preform so as to biaxially expand the preform outwardly against the walls of the blow mold so that it assumes the desired configuration.

Injection molding of preforms acceptable for later blow molding into container configurations, therefore, requires the balancing of many factors. A detailed supplement to the foregoing brief discussion of these factors is contained in the

*Blow Molding Handbook*, by Rosato and Rosato, Hanser Publishers, New York, N.Y., 1988, and particularly chapter 14 thereof. That publication is hereby incorporated herein by reference.

In systems and apparatus for the "runnerless" injection molding of articles/preforms of the type alluded to above, a mold and a molten material transport means are commonly provided. The mold typically includes a first cavity extending inwardly from an outer surface of the mold to an inner end, an article formation cavity, and a gate connecting the first cavity to the article formation cavity. The gate defines an inlet orifice in the inner end of the first cavity, and an outlet orifice which opens into the article formation cavity.

The means for transporting the material extends from a melt source to the vicinity of the inlet orifice of the gate. These means typically include an elongated bushing residing at least partially within the first cavity. This bushing defines an elongated, axial passageway therethrough which terminates at a discharge orifice.

A "gate area", therefore, is defined by the assembled mold and bushing between the discharge orifice of the bushing and the outlet orifice of the gate. Ideally, this gate area is the portion of the system/apparatus in which the transition of the material from the molten phase present in the "runnerless" injection apparatus to the glassy phase of the completed article occurs during the time period between sequential "shots" of material.

Specifically, during the injection of a "shot" of molten material (i.e., melt), the melt flows from the discharge orifice of the bushing, through the gap between the discharge orifice of the bushing and the inlet of the gate, through the gate, and into the article formation cavity of the mold. Since the temperature of the melt is maintained above its maximum crystal melt temperature in the bushing, and the temperature of the mold is maintained well below the minimum glass transition temperature of the material, the majority of each shot cools quickly to its glassy state in the article formation cavity of mold. This results in the preform containing low crystallinity levels (i.e., an article made up of substantially amorphous PET or other similar crystallizable polymer) because the material temperature does not remain within its characteristic crystallization range for any appreciable length of time.

At the end of each "shot" however injection pressure commonly is maintained on the melt for between about 1 and 5 seconds in order to assure that the melt is appropriately packed into the article formation cavity of the mold. Thereafter, the injection pressure on the melt is released, and the article is allowed to cool in the mold for between about 10 and 20 seconds. Subsequently, the mold is opened, the article is ejected therefrom, and the mold is reclosed. The latter steps take on the order of about 10 seconds. It will be understood, therefore, that for correct system operation the temperature of the melt material must transition in the gate area of the system/apparatus during the time interval between successive material "shots" between its molten phase temperature and its glassy (rigid) phase temperature in a controlled manner.

Accordingly, thermal control of the temperature gradients in the material located in the gate area between successive "shots" of molten material is critical both to the prevention of stringing or drooling of melt material from the gate, and to the prevention of gate freeze-off. In addition, a failure to isolate the majority of the crystallized melt material formed during this transition within the vestige which extends outwardly from the completed article ejected from the mold may be detrimental not only to the efficiency of subsequent blow molding operations, but also to the quality of the final blow molded article for the reasons mentioned above.

To accomplish this thermal gate control, the art has heretofore adopted two alternative approaches. In the first of these alternatives, a mechanical melt shut off mechanism is provided by what is known as a "valve gate". In the other alternative, the axial length of the gate is increased so as to ultimately form a vestige extending outwardly from the article/preform which is substantially longer than the comparatively short vestige normally resulting from "runnerless" injection molding operations.

The valve gate utilizes a pin which is axially movable in the bushing passageway. In a first retracted position, this pin allows melt material to flow through the bushing, into the gate area, and ultimately into the article formation cavity of the mold. In a second extended position, however, the distal end of the pin closes off the gate area, and thereby shuts off the flow of melt material therethrough. Specifically, the distal portion of the valve pin either may seal the inlet of the gate, or may substantially fill the volume defined by the gate so as to accomplish melt shut off.

This mechanism has several advantages. Principle among these is the preclusion of the potentially detrimental presence of melt material in the gate area between successive "shots". The absence of melt material adjacent to the gate outlet prevents stringing of melt material between the gate and the vestige. Drooling of melt material from the gate between "shots" also is prevented for the same reason. In addition, the resulting vestige (if any) is of acceptably short length, and is composed primarily of substantially amorphous material. The latter result is achieved because the vestige is substantially thermally isolated from the melt transport means upon extension of the valve pin. Consequently, the vestige (if any) cools primarily under the influence of the surrounding gate portion of the mold which, as mentioned above, is maintained well below the minimum glass transition temperature of the material.

Apparatus of the "valve gate" type, however, requires the presence of movable elements within the mold. It, therefore, may be expected that such apparatus will be subject to maintenance and repair problems. It further may be expected that the expense involved in such maintenance, repair and related system down time will be significant. This is because the movable valve pin is located deep within the mold, and is not readily accessible.

The elongated sprue alternative, on the other hand, evolved from the fact that the portion of the mold forming the gate walls in a conventional hot runner system is inadequate for controlling the crystallization of PET and similar crystallizable polymeric materials in the gate area during the time interval between successive material "shots". More particularly, it will be understood-that the metal (typically steel) forming the gate walls in a conventional hot runner system is located between the inner end of the first cavity of the mold adjacent to the inlet orifice of the gate and the portion of the article formation cavity of the mold adjacent to the outlet orifice of the gate. In such a system, the quantity and thermal conductivity properties of the metal defining the gate are not adequate to both (1) effectively withdraw heat from adjacent melt material in the article formation cavity of the mold in a manner which assures its amorphous nature in the completed article, and (2) at the same time effectively participate in the required melt material crystallization control in the gate area.

Accordingly, the axial length of the gate in some cases has been increased by artisans in the field of this invention so as to provide a gate wall structure capable of performing both of the above functions simultaneously. This, in turn, has resulted in the presence of an elongated sprue, or vestige, projecting from the finished article or preform.

The latter alternative has the advantage that the machine/mold designer can be relatively sure that substantially all crystallized material in the completed article/preform will be contained within the sprue. The resulting article/preform, however, may be adversely effected by the presence of the elongated sprue during the blow molding operation. Specifically, cracks may form at the sprue/article interface during the blow molding operation thereby ruining the blow molded article. Further, in the event that it is elected to clip the elongated sprues from the preform prior to blow molding, either to avoid crack formation or for aesthetic reasons, significant waste material, labor and other related costs may be generated.

Finally, it is to be noted that attempts to gain thermal gate control in a conventional hot runner system by increasing the spacing between the discharge orifice of the bushing and the inlet of the gate are not attractive for material crystallization control purposes. This is because increases in gate area volume act to increase the volume in which crystallization of melt material may occur during the time interval between successive "shots". Accordingly, the quantity of crystallized material left in the gate area after the ejection of a finished article or preform tends to increase.

Such increases in the quantity of crystallized material left in the gate area between successive "shots" are significant. This is because melt flow into the gate and/or article formation cavity during each "shot" is analogous to a fountain. Specifically, the melt tends to flow through the center of the gate and/or cavity, and to progressively spill outwardly toward the gate and/or cavity walls at locations immediately beyond the material which preceded it into the gate and/or cavity. Accordingly, an increase in the quantity of crystallized material left in the gate area between successive shots of material unacceptably increases the potential for that crystallized material to be conveyed into the main body of the next article formed by the system, rather than to be maintained within the gate area or within the vestige projecting from the next article molded by the system.

Decreases in the spacing between the discharge orifice and the gate inlet orifice also are not favored. Such decreases in spacing tend to adversely effect the temperature gradients in the gate area. Thus, thermal isolation of the gate area is reduced, and control of crystal formation becomes more difficult.

OBJECTS OF THE INVENTION

It, therefore, is an object of the present invention to provide a runnerless injection molding system/apparatus for the formation of articles of substantially amorphous PET or similar crystallizable polymers wherein the only portion of the article containing significant crystallized material is a short vestige extending outwardly from the main body of the formed article.

It is also an object of the present invention to provide a "runnerless" injection molding system/apparatus wherein the geometric configuration, composition and operating temperature range of the elements defining the gate area are selected such that such crystallization of a PET or similar crystallizable polymeric melt material as occurs between successive material shots is minimized.

Another object of the present invention is to provide a "runnerless" injection molding system/apparatus for PET and similar crystallizable polymeric materials wherein the cooling gradients in, and the overall thermal conductivity of the elements forming, the gate area are selected so as to optimize the control of melt material crystallization between successive "shots" of melt material without stringing or drooling of melt material from the gate outlet, or gate freeze off.

Still another object of the present invention is to provide a "runnerless" injection molding system/apparatus for PET and similar crystallizable polymeric materials wherein no moving parts are required in order to maintain thermal gate area control of the intermittent flow of melt material through the system/apparatus.

Yet another object of the present invention is to provide a "runnerless" injection molding system/apparatus suitable for the injection molding of bottle grade PET material such that the article formed in the article formation cavity of the mold is composed substantially of clear, amorphous PET, and such that substantially all crystallized PET material formed during the injection molding process is contained within a vestige extending outwardly from the main body of the molded article having a length no greater than about 0.090 inches.

Yet a further object of the invention is to provide an injection molded article formed of substantially amorphous PET or similar material including a vestige of minimal length which contains substantially all the excess spherulitic crystallized material formed during the creation of the article, and a method of making the same.

SUMMARY OF THE INVENTION

These and other objects of the invention are accomplished by the provision of a "runnerless" injection molding system/apparatus which includes a source of molten PET or similar crystallizable polymeric material, a mold, and a mechanism for transporting the molten material from the source to the mold. This injection molding system/apparatus is operable in a manner similar to the conventional injection molding method described above so as to form an article of substantially amorphous, crystallizable material.

The mold includes a temperature control mechanism and is openable. In addition, the mold is characterized by an outer surface, a longitudinal axis perpendicular to the outer surface, a first cavity centered on the longitudinal axis and extending into the outer surface to an inner end, an article formation cavity, and a gate centered on the longitudinal axis connecting the first cavity to the article formation cavity.

The first cavity includes an outer portion extending axially inwardly from the outer surface of the mold to an intermediate end, and an inner portion extending axially inwardly from the intermediate end of the outer portion to the inner end of the first cavity.

In the preferred embodiments, the outer portion of the first cavity defines a substantially cylindrical volume. The inner portion of the first cavity, on the other hand, defines a volume having a radially inwardly tapering configuration defined by a substantially curved wall. Specifically, the configuration of the inner portion of the first cavity has the form of a portion of a truncated, semi-spherical shape. This portion of a truncated, semi-spherical shape is defined by the curved side wall, the truncated end of the semi-spherical shape (i.e., the inner end of the first cavity), and a plane containing the intermediate end of the outer portion of the first cavity located parallel to, and spaced a perpendicular distance smaller than the radius of the semi-spherical shape from, its truncated end.

In a particularly preferred embodiment, the inner portion of the first cavity includes walls which define (i) an outer volume having the shape of a portion of a truncated, semi-spherical volume similar to that described above which is located adjacent to the intermediate end of the outer portion of the first cavity, and (ii) an inner, substantially frusto-conical volume which is located between the intermediate end of the outer volume and the inner end of the first cavity. In the latter embodiment, the truncated end of the outer volume mates with the larger end of the inner, frusto-conical volume.

The gate includes an inlet orifice, an outlet orifice, a first gate portion and a second gate portion. The first gate portion extends axially inwardly from the inner end of the first cavity. The second gate portion extends from the first gate portion to the outlet orifice of the gate. Further, the gate inlet orifice communicates with the first cavity, and the gate outlet orifice communicates with the article formation cavity.

More particularly, the first gate portion comprises a wall defining a substantially cylindrical volume. The second gate portion, on the other hand, comprises a second wall defining a substantially frusto-conical volume which flares radially outwardly as it extends longitudinally inwardly towards the article formation cavity from the first gate portion. Further, the axial length of the first gate portion is substantially shorter than the axial length of the second gate portion.

The melt material transport mechanism includes at least one temperature control device, and a bushing. The bushing is an elongated element having a distal end. It also defines an axial passageway therethrough which terminates at a discharge orifice located at the distal end of the bushing. The bushing is adapted to be mounted within the first mold cavity such that its discharge orifice is located in close proximity to the inlet orifice of the gate.

More particularly, the elongate bushing includes a proximal end, a proximal portion adjacent to and extending distally from the proximal end, a distal end, and a distal portion extending between the proximal portion and the distal end. The proximal end of the bushing includes a melt receiving orifice adapted to connect the axial bushing passageway with the melt source. The proximal bushing portion is adapted for at least partial location within the outer portion of the first cavity, and the distal portion of the bushing is adapted for at least partial location within the inner portion of the first cavity.

It has been found that the foregoing design, in combination with the appropriate selection of the operating temperatures of the mold and the bushing respectively, allows the injection molding of PET and similar crystallizable polymers without the need for movable valve gate type mechanisms or gates of extended axial length. Further, this structure allows the injection molding of articles of substantially amorphous PET or similar crystallizable polymers wherein substantially all crystallized material formed during the injection molding process is located within a vestige of minimal length extending outwardly from the completed article.

This has been accomplished by (i) providing means for controlling the temperature of the mold and melt transport means, (ii) appropriately selecting the thermal conductivities of various elements of the system/apparatus, (iii) the provision of walls extending between the intermediate end of the outer portion of the first mold cavity and the outlet orifice of the gate which define a generally hourglass-shaped volume as specified above, and (iv) locating the discharge orifice of the melt transport means in close proximite, but non-touching relationship to, the inlet orifice of the gate. So doing has created a structural combination wherein the metallic material of the mold located between the outer portion of the first cavity and the outlet orifice of the gate acts both (1) to remove the required quantum of heat from material located within the adjacent portion of the article formation cavity of the mold, and (2) to control crystal formation. Specifically, this control is such that material crystallization is minimized and also restricted to material residing in the gate area of the mold during the intervals between successive "shots" of melt material.

For the particular case of so-called bottle grade PET (i.e., PET having an intrinsic viscosity between about 0.70 and about 0.85) and a particular range of gate inlet orifice diameters (which are determined by the requirements of the article formation cavity of the mold and the characteristics of the material being molded), it has been found that an injection molding system/apparatus as generally described above having specific dimensional relationships among its elements works well for the foregoing purposes in an otherwise substantially conventional molding method. The details of this specific embodiment of the invention will be discussed in detail below. It is to be understood, however, that in this, and in all other cases discussed herein, it is contemplated that the melt transport mechanism is to be held at a temperature above the maximum crystal melt temperature of the material being molded, and that the mold temperature is to be held well below the minimum glass transition temperature of the material being molded. Accordingly, the present invention provides an injection molding system/apparatus having a unique and novel configuration at, and adjacent to, the gate area of the system. This is a significant advance over the prior art discussed above, and provides a material crystallization control capability not heretofore believed to be consistently attainable in a "runnerless" injection molding system.

BRIEF DESCRIPTION OF THE DRAWINGS

The foregoing and other features and advantages of the invention will be more fully understood by those skilled in the art in view of the detailed description of the preferred embodiments thereof set forth below with reference to the appended drawings in which like reference numerals are used to refer to like elements throughout, and wherein.

DETAILED DESCRIPTION OF PREFERRED EMBODIMENTS

Figure 1:
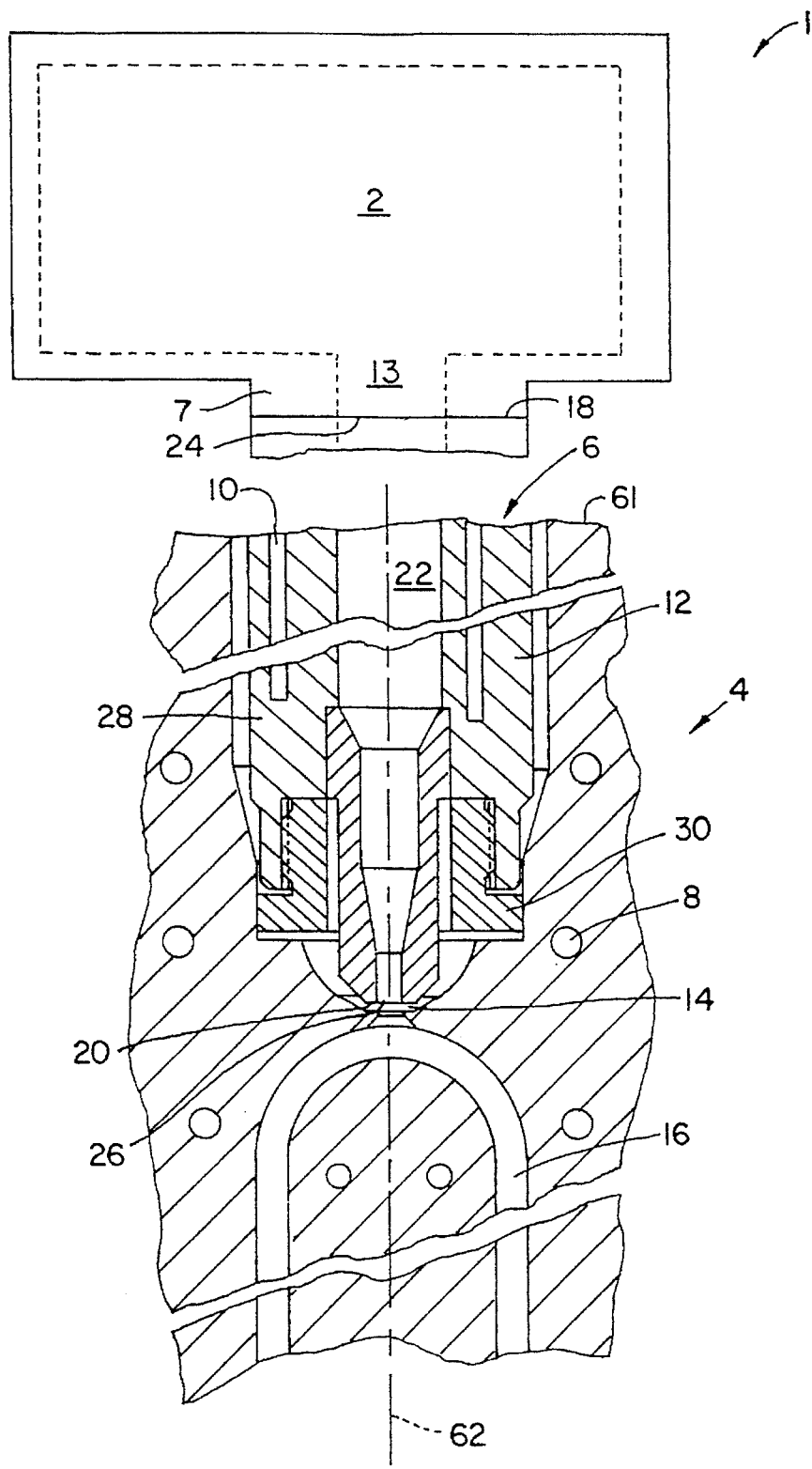
FIG. 1 is an illustrative, side elevational view, partially cut away and partially in section, of an injection molding system in accordance with the present invention.
Figure 5A:
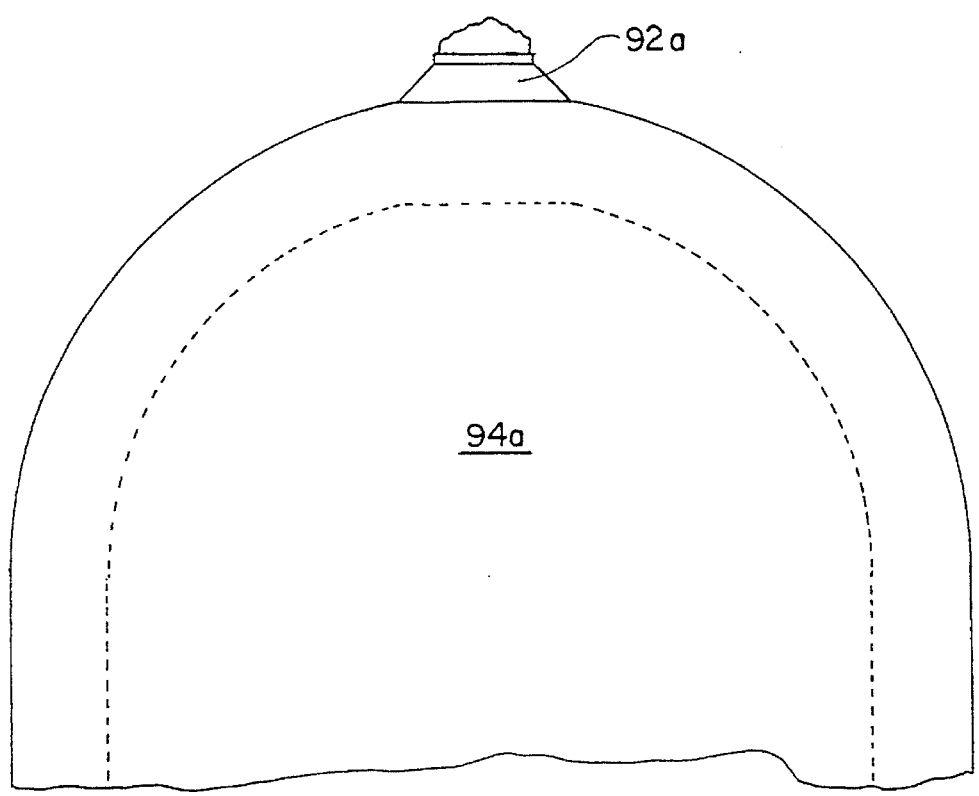
FIG. 5A is an illustrative, side elevational view of a blow molding preform formed by an injection molding system in accordance with the present invention.

Referring now to the drawings, and particularly to FIG. 1, there is illustratively shown an injection molding system/apparatus 1 for forming articles of amorphous, crystallizable polymeric materials such as PET in accordance with this invention (see for example FIG. 5A). Generally speaking, this system includes a source 2 of melt material, a mold 4 and melt transport means 6.

Figure 6:
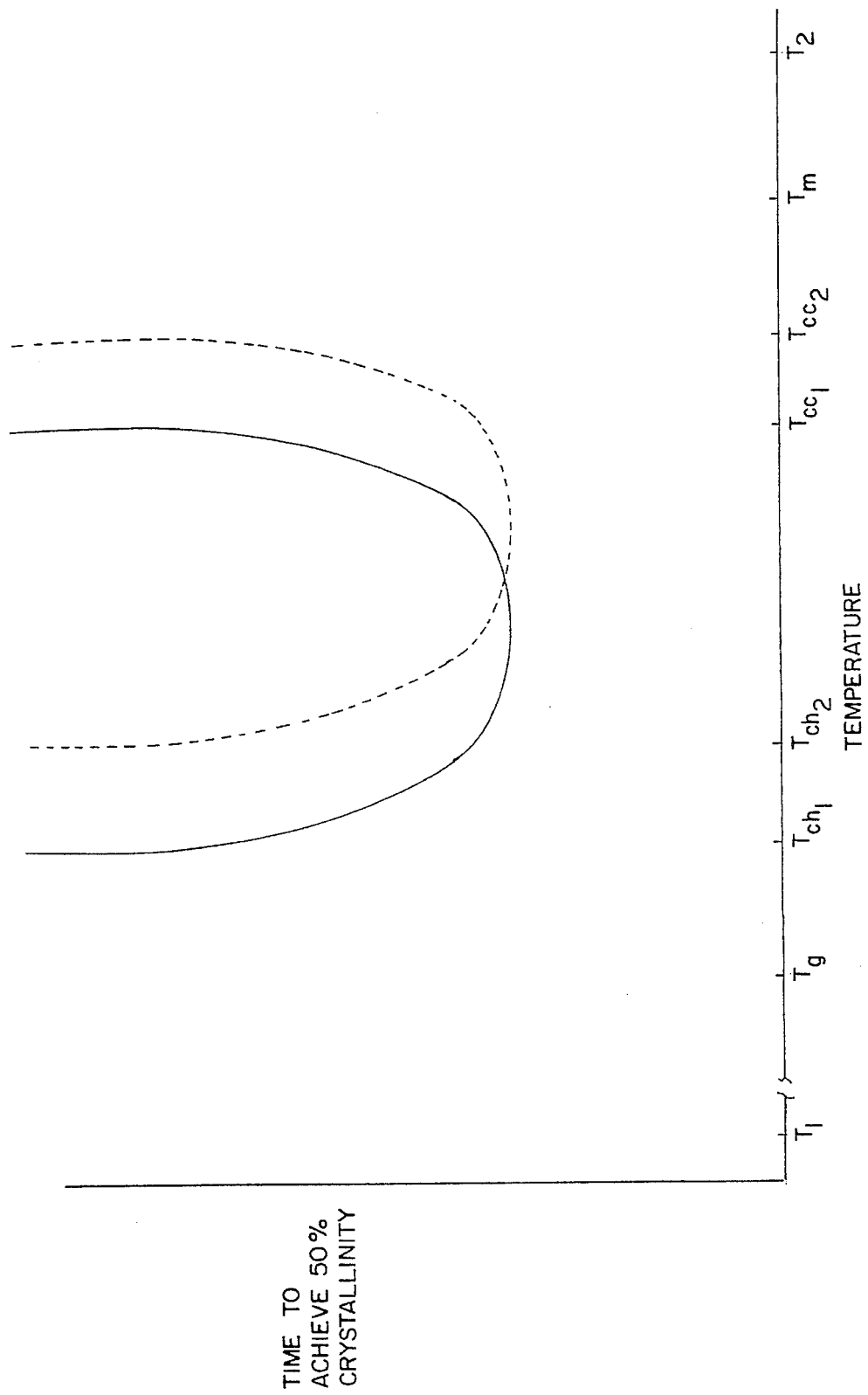
FIG. 6 is an illustrative, graphical representation on a time versus temperature graph showing the crystallization characteristics of a PET material having an intrinsic viscosity of 0.70 in solid lines and of a PET material having an intrinsic viscosity of 0.85 in dotted lines.

The mold 4 and the melt transport means 6 each include temperature control devices, representatively shown at 8 and 10, respectively. The mold temperature control devices 8 are adapted to maintain the mold at a temperature ($T_1$) much less than the minimum glass transformation temperature (hereinafter referred to as $T_g$, see FIG. 6) of the melt material. The melt transport means temperature control devices 10, on the other hand, are adapted to maintain the melt contained in the melt transport means 6 at a temperature ($T_2$) above the maximum crystalline melting temperature of the material being molded (hereinafter referred to as $T_m$, see FIG. 6).

The source 2 may be any convenient container adapted (i) to hold a quantity of the material to be molded in a molten condition, and (ii) to deliver the same to melt transport means 6. It is often found to be convenient to include in source 2 means (not shown) for converting solid material (such as pellets) into molten form, and means (not shown) for injecting the molten material into melt transport means 6 under controlled and variable pressure. Accordingly, the source might, for example, include a hopper and a variable speed, screw type plastisizing device for intermittently providing a flow of molten material to the melt transport means 6 under controllably variable pressure.

Melt transport means 6 usually includes a manifold, generally indicated at 7, and at least one bushing 12. Manifold 7 typically receives the melt material from the source 2 and transports it through various runner channels, generally indicated at 13, to one or more bushings 12. Bushings 12 in turn transport the melt received from manifold 7 to respective gate areas 14 in mold 4 for ultimate injection into article formation cavities 16 therein.

Generally speaking, bushings 12 are elongated elements each having a longitudinal axis 17, a proximal end 18, a distal end 20 and an axial passageway 22 extending therethrough from a melt receiving orifice 24 in proximal end 18 to a discharge orifice 26 in distal end 20. Melt receiving orifice 24 of passageway 22 communicates with source 2 via at least one runner 13 in manifold 7. Therefore, passageway 22 provides a transport channel for the melt between source 2 and discharge orifice 26. In addition, bushing 12 includes a first portion 28 adjacent to proximal end 18, and a second portion 30 connecting first portion 28 to distal end 20.

In the preferred embodiments depicted in the drawings (see FIGS. 1 and 4), bushing 12 is formed of three parts; namely, main bushing body 32, bushing tip 34 and bushing insert 36.

Main bushing body 32 (usually formed of steel) is typically a substantially cylindrical, elongated member extending from proximal end 18 to an intermediate end 38. First and second counterbores, 40 and 42 respectively, extend into intermediate end 38 surrounding passageway 22. First counterbore 40 has a larger diameter and shorter length than second counterbore 42.

Bushing tip 34 is typically formed of a metallic material adapted to minimize heat transfer from the transport means 6 to the mold 4. In appropriate circumstances this material may be steel, stainless steel, titanium or some other metallic material having the desired heat transfer characteristics. The bushing tip 34 includes a cylindrical member 44 having an inner diameter substantially the same as the diameter of counterbore 42, and an annular flange 46 extending radially outwardly about one of its ends 48. Tip 34 resides in pressure fit, screw threaded or other firm engagement within first counterbore 40. In this position, the other end 50 of member 44 abuts shoulder 52 at the inner end of first counterbore 40, and flange 46 resides in closely spaced relation to intermediate end 38 of main bushing body 32.

Figure 2:
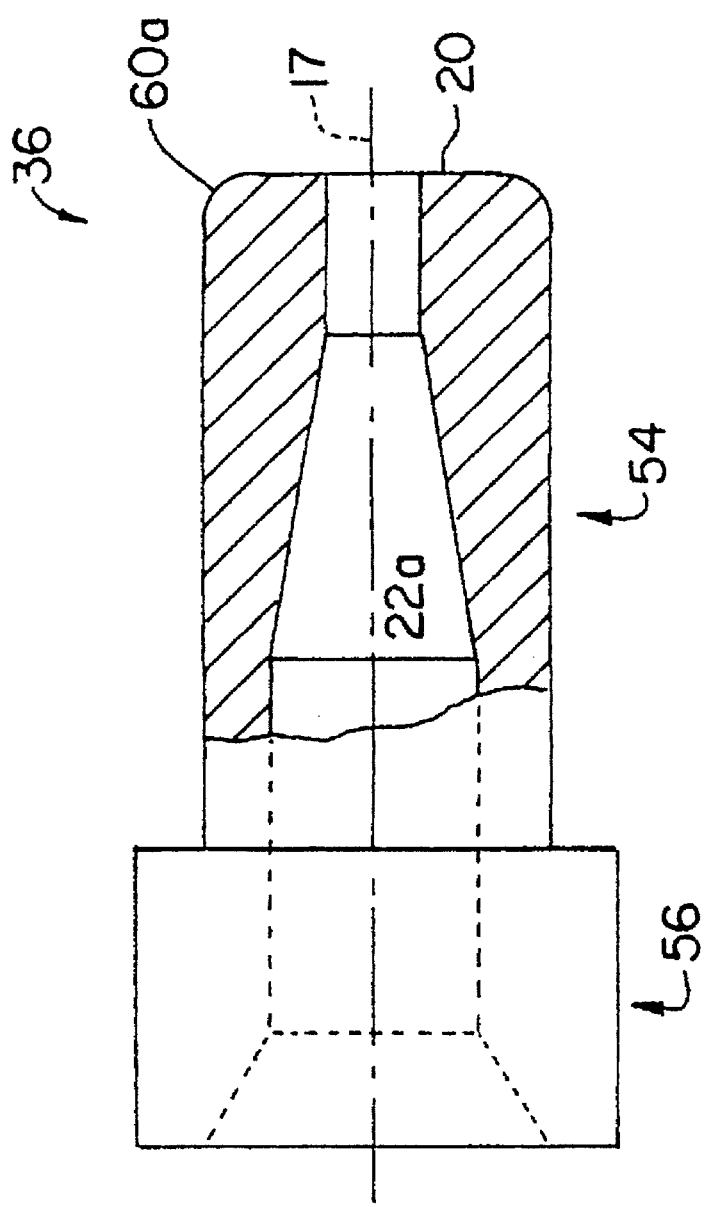
FIG. 2 is an illustrative, side elevational view in partial section of an injection molding bushing insert for use in a system/apparatus in accordance with the present invention.
Figure 4:
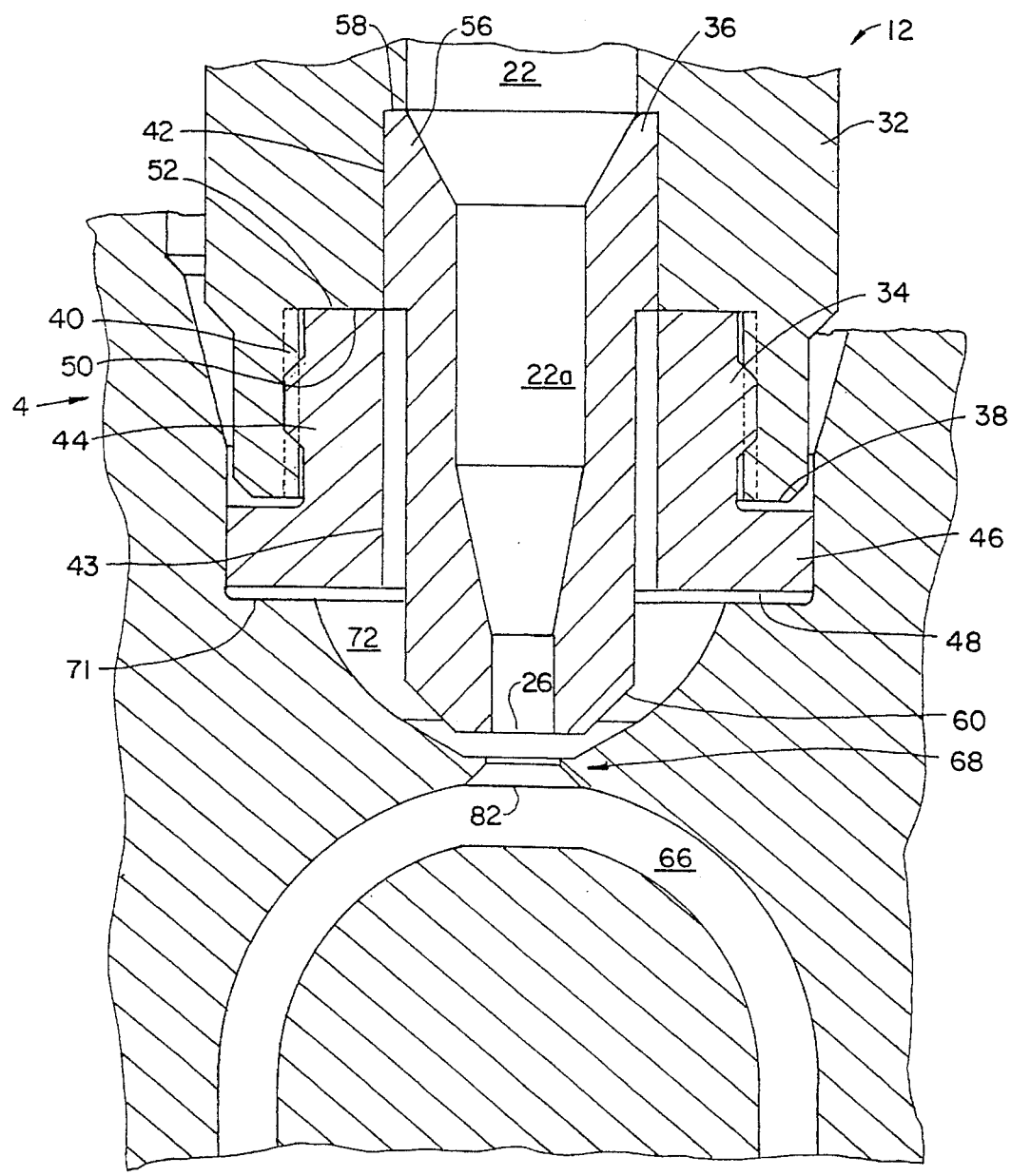
FIG. 4 is an enlarged, illustrative, side elevational view, partially cut away and in section, of the gate area and surrounding structure of the assembled injection molding system shown in FIG. 1.

Bushing insert 36 (alternative embodiments of which are shown in FIGS. 1 and 4 on the one hand, and in FIG. 2 on the other hand) is also substantially cylindrical. It includes distal end 20, a distal portion 54 adjacent to distal end 20, and a proximal portion 56 extending proximally from distal portion 54. The longitudinal length of proximal portion 56 is substantially the same as the difference between the axial lengths of counterbores 40 and 42. The diameter of proximal portion 56 is substantially the same as the diameter of counterbore 42. The longitudinal length of distal portion 54, however, exceeds the longitudinal length of counterbore 40. Further, the diameter of distal portion 54 is slightly smaller than the diameter of passageway 22 in main bushing body 32. It accordingly will be understood that distal portion 54 of insert 36 is adapted to extend outwardly from end 48 of tip 34. Similarly, it will be understood that proximal portion 56 of insert 36 is adapted to be affixed in counterbore 42 securely against shoulder 58.

In the preferred case, insert 36 is formed of a copper alloy. Further, it includes a distally tapered outer surface 60 adjacent its distal end 20. Still further, insert 36 defines a distally tapering, axial passageway 22a therethrough which is adapted to mate at its larger end with passageway 22 through main bushing body 32.

Mold 4 is an openable structure which defines a first surface 61, a longitudinal axis 62 perpendicular to first surface 61, a first cavity 64 centered on longitudinal axis 62 and extending into first surface 61, an article formation cavity 66, and a gate 68 centered on longitudinal axis 62 connecting first cavity 64 to article formation cavity 66.

First cavity 64 includes an outer portion 70 extending axially inwardly from first surface 61 to an intermediate end 71, and an inner portion 72 extending axially inwardly from intermediate end 71 of outer portion 70 to the inner end 74 of first cavity 64.

Figure 3A:
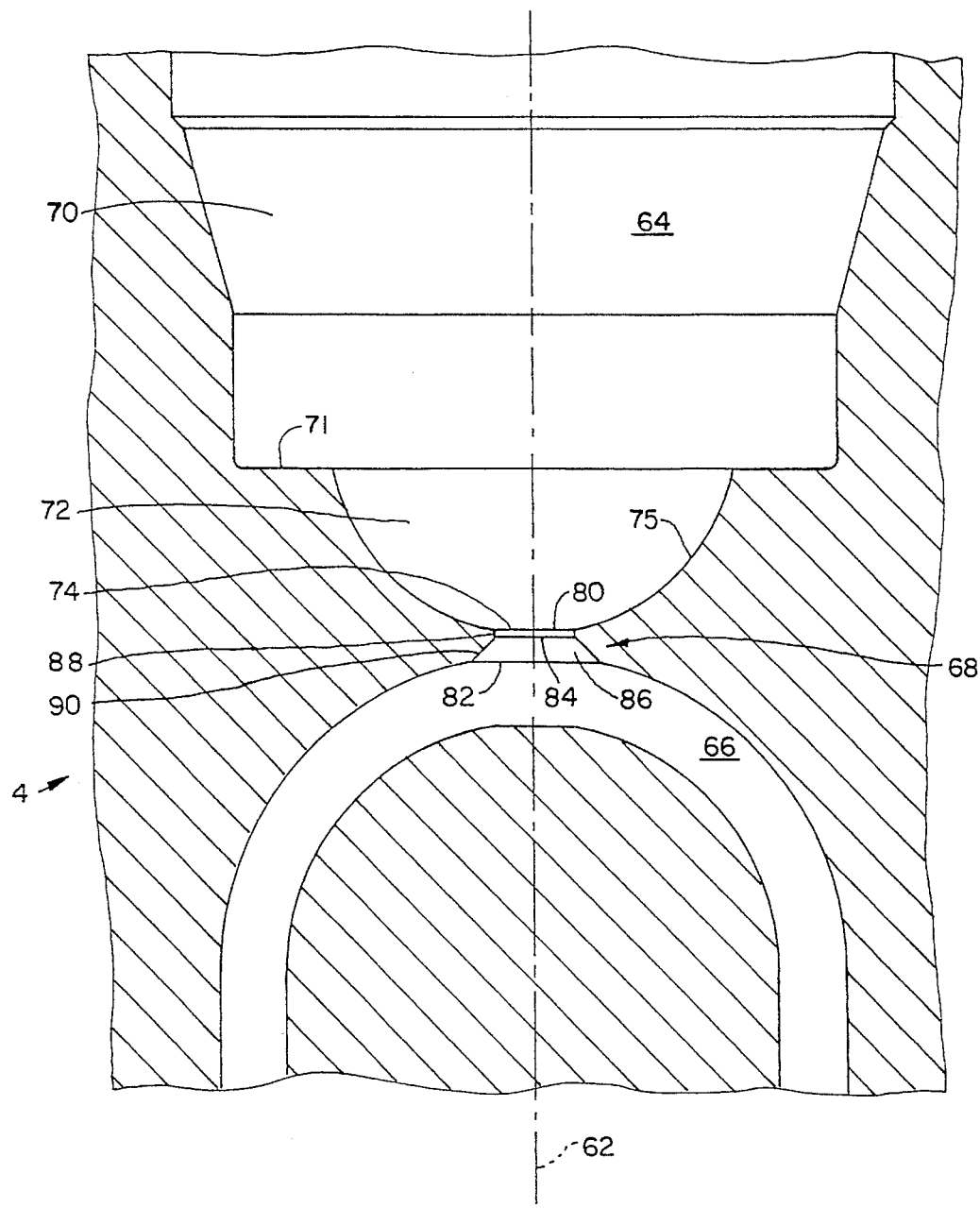
FIG. 3A is an illustrative, cross-sectional, side elevational view of the gate area of an injection mold in accordance with the present invention.

In a preferred embodiment, outer portion 70 defines a generally cylindrical volume. Inner portion 72, on the other hand, comprises curved walls 75 defining a radially inwardly tapering volume. Specifically, the configuration of inner portion 72 has the form of a portion of a truncated, semi-spherical shape. This portion of a truncated, semi-spherical shape is defined by the curved side wall 75, the truncated end of the semi-spherical shape (i.e., the inner end 74 of first cavity 64), and a plane containing intermediate end 71 of outer portion 70 of first cavity 64 which is parallel to, and spaced a perpendicular distance smaller than the radius of the semi-spherical shape from, its truncated end (see FIG. 3A).

Figure 3B:
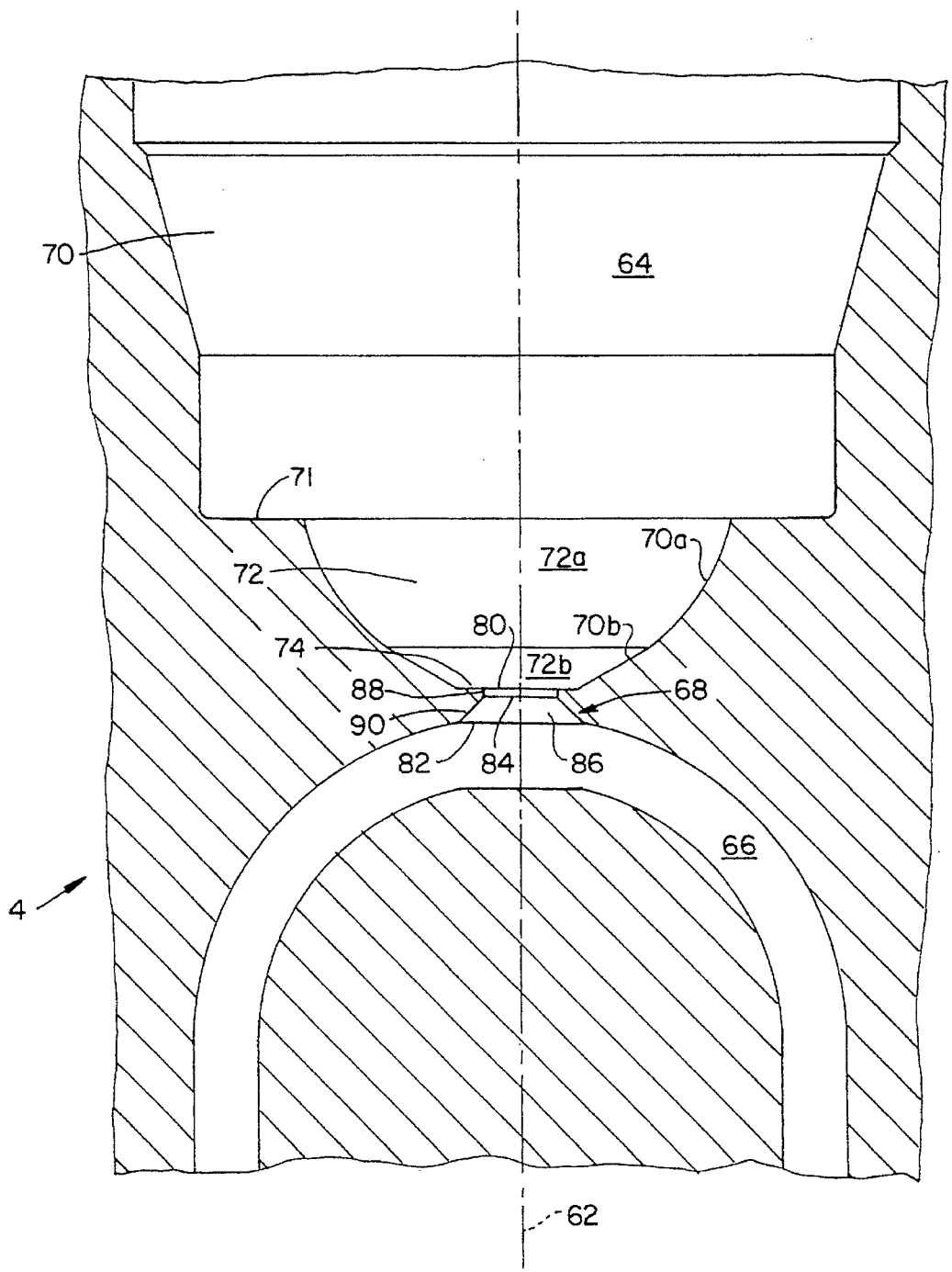
FIG. 3B is an illustrative, cross-sectional, side elevational view of a gate area of another injection mold in accordance with the present invention.

In a particularly preferred embodiment (see FIG. 3B), inner portion 72 includes walls 76a and 76b which define (i) an outer volume 72a comprising a portion of a truncated, semi-spherical shape similar to that described above which is located adjacent to, and axially inwardly of, intermediate end 71 of outer portion 70, and (ii) an inner, substantially frusto-conical volume 72b which is located between the outer volume 72a and the inner end 74 of first cavity 64. In the latter embodiment, the truncated end of the outer volume 72a of inner portion 72 of first cavity 64 mates with the larger end of the inner, frusto-conical volume 72b.

Gate 68 includes an inlet orifice 80, an outlet orifice 82, a first portion 84 and a second portion 86. First portion 84 of gate 68 extends axially inwardly from inner end 74 of first cavity 64. Second portion 86 of gate 68 extends from first portion 84 to outlet 82 of gate 68. Further, gate inlet orifice 80 communicates with first cavity 64, and gate outlet orifice 82 communicates with article formation cavity 66.

More particularly, first portion 84 of gate 68 includes a wall 88 defining a substantially cylindrical volume. Second portion 86 of gate 68, on the other hand, includes a second wall 90 defining a substantially frusto-conical volume which flares radially outwardly and axially inwardly from first portion 84. Further, the axial length of first portion 84 of gate 68 is substantially shorter than the axial length of the second portion 86 of gate 68.

The relative dimensional relationships of the above-described elements in the assembled configuration of the system/apparatus of the present invention is best seen in FIG. 4. It will be understood by those skilled in the art that during the operation of the system just described in a substantially conventional manner, the melt flows through the passageway 22a and out of discharge orifice 26. At this point, melt will fill the volume of inner portion 72 of first cavity 64 surrounding insert 36, and the gap between distal portion 54 of insert 36 and the inner wall 43 of tip 34. This material, which will solidify along the outer periphery of inner portion 72, but remain molten adjacent insert 36, acts as an insulation medium assisting in the provision of thermal control of the material in gate area 14 between successive "shots" of melt. Further, melt will flow through gate area 14 located between discharge orifice 26 and outlet orifice 82 of gate 68 into article formation cavity 66.

Figure 5B:
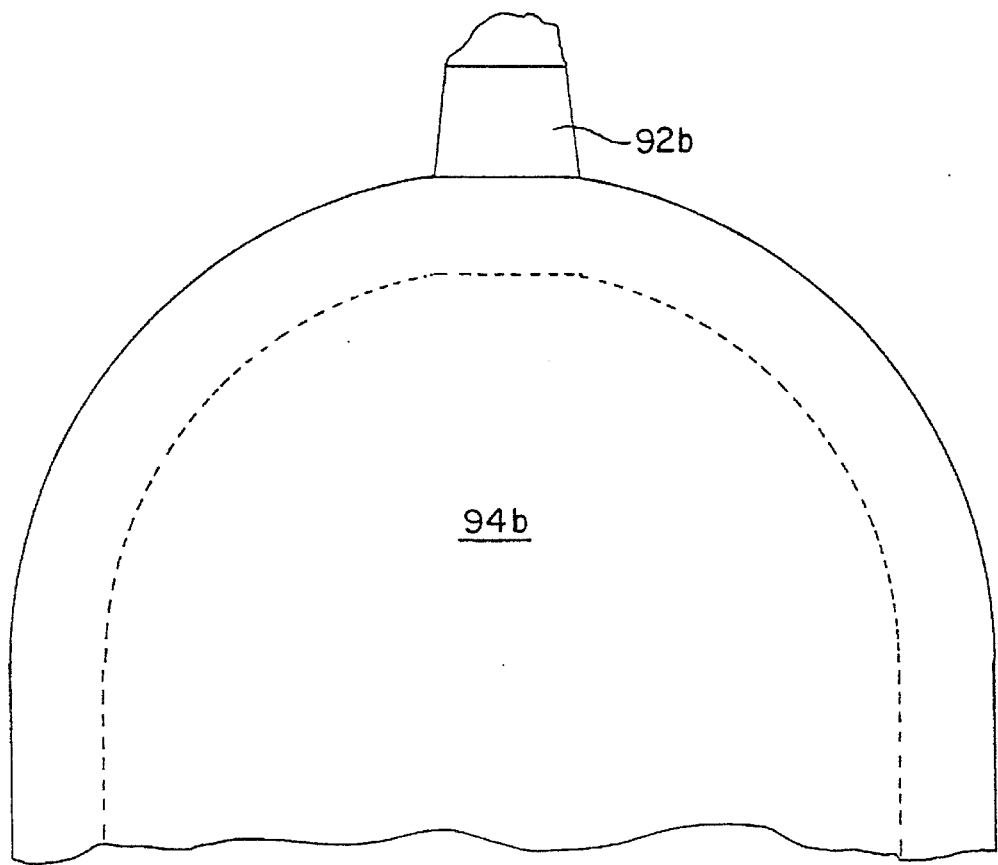
FIG. 5B is an illustrative, side elevational view of a blow molding preform formed by an injection molding system in accordance with the prior art.

It also is to be noted that the vestige 92a extending outwardly from a completed molded article 94a made by the present system/apparatus is substantially shorter than the vestige 92b extending outwardly from a completed molded article 94b made by the extended sprue alternative of the prior art (compare FIG. 5A with FIG. 5B). Indeed, elongated sprues of the prior art have been as long as about 0.75 inches, while vestiges in accordance with this invention have been made so as not to exceed about 0.090 inches in length. Further, no adverse crystallization in the main bodies of molded articles made by the present system/apparatus has been noted. Instead, such crystallization as is present in completed articles formed using the present system/apparatus has been limited to the vestige volume without the need for excessive vestige length.

It is well understood in the art that the smallest diameter of the gate of an injection molding system/apparatus is determined by the fill requirements of the article formation cavity of the mold, and also to some extent by the characteristics of the material being processed by the system/apparatus. It is further well understood that variations of the smallest gate diameter require modifications of the relative dimensions of the other elements of the system/apparatus at, and adjacent to, the gate area of the mold. Still further, it is well understood in the art that these variations of the relative dimensions of the other elements of the system/apparatus are not in the nature of simple upsizing or downsizing in proportion to the alterations of the smallest gate diameter. Instead, these variations are determined by an analysis of the new temperature gradients present in the gate area of the modified mold.

This analysis is made in order to be sure that during the interval between "shots" of melt material, the portion of the melt material residing in the mold which is at a temperature within its characteristic crystallization range is minimized, and also located substantially wholly within the gate area of the mold. Typically, these gradients are analyzed by the use of finite element analysis or other mathematical modeling techniques. Accordingly, given the above detailed description of the desired relative geometric configurations of the elements at, and adjacent to, the gate area of the mold for crystallizable polymeric materials such as PET, it is deemed to be well within the skill in the art to adjust the particular dimensions of the elements of the system/apparatus according to the required smallest gate diameter and the characteristics of the material being processed.

By way of a specific example, bottle grade PET (i.e., PET having an intrinsic viscosity between about 0.70 and about 0.85) has been injected through a required smallest gate diameter between about 0.094 inches and about 0.150 inches so as to yield substantially amorphous PET articles. Those articles had a vestige length of between about 0.060 inches; and about 0.090 inches. Further, visual examination of those articles under polarized light revealed that the vestige contained substantially all of the crystallized PET formed during the injection molding process.

In the system/apparatus used to form the above-referred-to articles, the elements defining, and adjacent to, the gate area had the dimensional relationships to each other set forth below.

Wall 88 of frusto-conical portion 86 of gate 68 was disposed at an outwardly pointing angle of between about 30° and about 60° to the longitudinal axis 62 of the gate, with the optimum angle being about 45°. The gate 68 had an overall axial length of between about 0.030 inches and about 0.125 inches, with the optimum being about 0.050 inches. Cylindrical portion 84 of gate 68 had an axial length of between about 0.005 inches and about 0.075 inches, with the optimum being about 0.010 inches. The diameter of cylindrical portion 84 of gate 68 was between about 0.094 inches and about 0.150 inches, with the optimum being about 0.110 inches.

Distal end 20 of insert 36 was axially spaced from the inlet orifice of gate 68 by an axially measured distance of between about 0.010 inches and about 0.050 inches, with the optimum being about 0.040 inches.

Insert 36 was formed of nickel plated berylium copper having a thermal conductivity of between about 130 W/(M° C.) and 210 W/(M° C.). Distal end 20 of insert 36 had a diameter of between about 0.200 inches and about 0.450 inches, with the optimum being about 0.360 inches, and discharge orifice 26 had a diameter of between about 0.078 inches and about 0.156 inches, with the optimum being about 0.098 inches. The proximal end of insert passageway 22a had a diameter between about 0.156 inches and about 0.400 inches, with the optimum being about 0.375 inches, and was mated with a corresponding diameter of passageway 22 through the main bushing body 32. Further, exterior surface 60 of insert 36 was tapered adjacent to its distal end 20 at an angle between about 30° and about 60° to its longitudinal axis. It has been found, however, that the latter exterior surface can define an outwardly curved arc (see FIG. 2, reference number 60a) without significant adverse effect upon the operation of the system/apparatus.

In one case, inner portion 72 of first cavity 64 of mold 4 was defined by a side wall 75 extending along an arc from intermediate end 71 of first portion 70 of first cavity 64 to inner end 74. More specifically, inner end 74 of first cavity 64 had a diameter between about 0.094 inches and about 0.375 inches, with the optimum being about 0.170 inches. The arc of side wall 75 forming inner portion 72 of first cavity 64 had a radius between about 0.250 inches and about 1.0 inch, with the optimum being about 0.328 inches. That radius was centered on longitudinal axis 62 between about 0.094 inches and about 1.0 inch outwardly of the inner end of the cylindrical portion of gate 68, with the optimum being about 0.350 inches (see FIG. 3A).

In a second case, side wall 76b of inner portion 72 of first cavity 64 adjacent to inner end 74 extended proximally and radially outwardly from inner end 74 at a distally pointed angle to longitudinal axis 62 of gate 68 of between about 30° and about 60°, with the optimum being on the order of about 55°. In the latter case, side wall 76b joined curved wall 76a at a location between intermediate end 71 of first portion 70 of first cavity 64 and inner end 74 thereof (see FIG. 3B).

Further, the temperature controls, 8 and 10 respectively, maintained the temperature of mold 4 between about 35° F. and about 100° F., and maintained the temperature of melt transport mechanism 6 between about 500° F. and about 600° F. As will be clear from reference to FIG. 6, the mold temperature ($T_1$) was well below the minimum glass transformation temperature ($T_g$) of the PET materials to be molded (i.e., about 180° F.) and the melt transport mechanism temperature ($T_2$) was above the maximum crystal melt temperature ($T_m$) of the PET materials to be molded (i.e., about 485° F.).

Still further, it will be understood that the crystallization ranges of the PET materials in question resided well within the temperature range between $T_1$ and $T_2$ established between the mold and the melt transport mechanism. Material crystallization rates in these crystallization ranges are shown in solid line for 0.70 intrinsic viscosity PET, and in dotted line for 0.85 intrinsic viscosity PET in FIG. 6. Specifically, these crystallization ranges are between the temperature of crystallization onset on heating ($T_{ch1}$ and $T_{ch2}$) and the temperature of crystallization onset on cooling ($T_{ch1}$ and $T_{cc2}$), respectively.

Therefore, during injection molding of the melt material, it passed quickly through its characteristic crystallization range in the article formation cavity of the mold. During the interval between successive "shots" of melt, however, the configuration of the gate area and surrounding elements was such that such crystallization of the material as occurred was limited to the material residing in the gate area. This crystallization was minimized by the heat transfer characteristics built into the system/apparatus by virtue of the above described invention.

Figure 7:
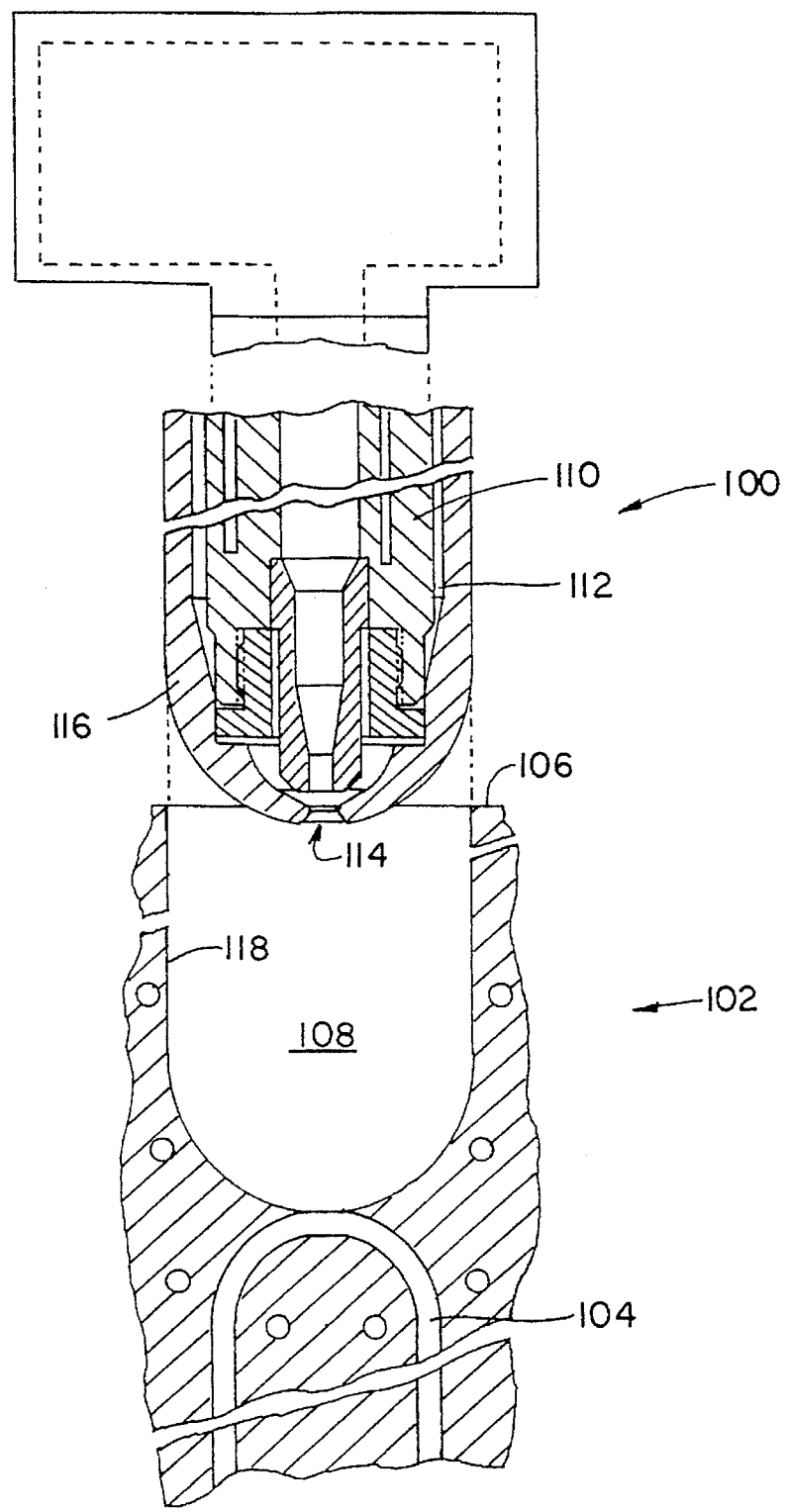
FIG. 7 is an illustrative side elevational view, partially cut away and in partial section, of an alternative injection molding system in accordance with the present invention wherein the elements of the system are shown in partially exploded relationship to one another for clarity.

It will additionally be understood that the foregoing detailed description of the preferred embodiments of the invention is intended to be illustrative, and in no way limiting, of the present invention in its broadest aspects. For example, as is representatively shown in FIG. 7, the invention may be embodied in a structure 100 adapted for insertion into a mold 102. In this alternative, the mold 102 defines an article formation cavity 104 communicating with an outer surface 106 of the mold through a comparatively large opening 108. A secondary mold portion 116 also is provided. Secondary mold portion 116 is adapted to receive the bushing 110, and incorporates the structure and interrelationships of the first cavity 112 and gate area 114 substantially as discussed above. Secondary mold portion 116 further is provided with an exterior configuration adapted to tightly engage the sidewall 118 of the comparatively large opening 108 in mold 102. Accordingly, when the elements of this alternative are disposed in their assembled configuration, secondary mold portion 116 effectively forms a portion of the overall mold of the system/apparatus.

The latter configuration has several potential advantages. Specifically, the same basic mold may be utilized for different materials requiring different smallest gate diameter openings. This is to say that one unit may be removed from the basic mold and replaced with another better designed for an alternative material to be molded into the configuration of the article formation cavity. Obviously, this capability also facilitates repair of the critical portions of the molding system. In addition, the mold maker is relieved of the responsibility of making his product compatible with that of the bushing manufacturer. The latter advantage can provide significant cost savings in bringing a system on line because a single manufacturer is responsible for the appropriate mating relationship of all of the important elements of the crystallization control system. Other advantages of this alternative will occur to those skilled in the art.

Accordingly, it is contemplated that various modifications, changes, alterations, variations and the like may be made to the above-described subject matter without departure from the invention in its broadest aspects. The present invention, therefore, is to be considered to be limited only by the terms of the appended claims.

We, therefore, claim:

1. Apparatus adapted for use in conjunction with a mold in injection molding articles of a substantially amorphous, crystallizable polymeric material, said material having a characteristic minimum glass transition temperature, a characteristic maximum crystal melting temperature, and a characteristic crystallization temperature range, and said mold defining an article formation cavity connected to an exterior surface of said mold by a passageway, and including means for maintaining said mold at a temperature substantially below said characteristic minimum glass transition temperature of said polymeric material;

said apparatus comprising:

a mold insert comprising (a) a side surface adapted for location within said mold passageway in substantially isothermal engagement therewith; (b) an outer surface; (c) an axis perpendicular to said outer surface; (d) a first cavity centered on said axis, said first cavity extending into Said outer mold insert surface to an inner end, said first cavity defining portion located between said outer mold insert surface and an intermediate end and an inner portion located between said intermediate end and said inner end; and (e) a gate having an inlet orifice associated with said inner end of said first cavity and an outlet orifice adapted for association with said article formation cavity when said mold insert is located in said mold passageway such that said gate connects said inner portion of said first cavity to said article formation cavity of said mold; and transport means for intermittently receiving preselected quantities of said polymeric material in molten form at a location remote from said inlet orifice of said gate, and ejecting quantities of said molten polymeric material substantially equal to said preselected quantities of said polymeric material from, a location proximate to said inlet orifice of said gate;

said transport means comprising temperature control means for maintaining said transport means at a temperature above said characteristic maximum crystal melting temperature of said polymeric material and an elongate bushing;

said elongate bushing having a proximal end defining a material receiving orifice, a distal end defining a material discharge orifice and an unobstructed lumen therethrough connecting said material receiving orifice to said material discharge orifice;

said bushing being at least partially telescopically and axially inserted into said first cavity of said mold insert such that said discharge orifice is located within said inner portion of said first cavity in close proximity to said inlet orifice of said gate;

wherein:
(i) said inner end of said first cavity has a periphery,
(ii) said inner portion of said first cavity is defined by a side wall which curves inwardly from said intermediate end to said periphery of said inner end such that said inner end and said side wall together define a portion of a truncated, substantially semi-spherical volume, and
(iii) said gate defines a substantially cylindrical portion extending axially inwardly from said inlet orifice and a frusto-conical portion flaring outwardly from said cylindrical portion to said outlet orifice;

whereby during the intervals between said intermittent ejection of said quantities of said molten polymeric material through said discharge orifice of said bushing, crystallization of the next preceding one of said quantities of said molten polymeric material occurs substantially only in a small volume located between said discharge orifice of said bushing and said outlet orifice of said gate; and whereby upon the removal of a completed article from said article formation cavity of said mold, said polymeric material neither strings between said outlet orifice of said gate and a vestige protruding from said article, nor drools from said outlet orifice of said gate.

2. The apparatus according to claim 1, wherein said polymeric material is polyethylene terephthalate, and wherein:
(i) said cylindrical portion of said gate has a diameter between about 0.094 inches and about 0.150 inches;
(ii) said frusto-conical portion of said gate comprises a side wall disposed at an outwardly pointed angle to said longitudinal axis of between about 30° and about 60°;
(iii) said gate has an overall axial length of between about 0.030 inches and about 0.125 inches;
(iv) said cylindrical portion of said gate has an axial length of between about 0.005 inches and about 0.075 inches;
(v) said bushing is adapted to be located in said first cavity such that said distal end thereof is axially spaced from said inlet orifice of said gate by an axially measured distance of between about 0.010 inches and about 0.050 inches;
(vi) said bushing comprises a metallic material having a thermal conductivity of between about 130 W/(M° C.) and about 210 W/(M° C.);
(vii) said distal end of said bushing has a diameter of between about 0.200 inches and about 0.450 inches;
(viii) said discharge orifice has a diameter of between about 0.078 inches and about 0.156 inches;
(ix) said bushing has an exterior surface, and said exterior surface is tapered adjacent to said distal end of said bushing at an inwardly pointed angle between about 30° and about 60° to said longitudinal axis;
(x) said bushing passageway includes a proximal portion, said proximal portion having a diameter between about 0.156 inches and about 0.400 inches;
(xi) said inner portion of said first cavity is defined by a side wall extending along an arc from said intermediate end to said inner end, the radius of said arc being between about 0.250 inches and about 1.0 inch centered on said longitudinal axis between about 0.094 inches and about 1.0 inch outwardly from the joinder of said cylindrical and said frusto-conical portions of said gate;
(xii) said inner end of said first cavity has a diameter between about 0.094 inches and about 0.375 inches;
(xiii) said temperature controls maintain the temperature of said mold between about 35° F. and about 100° F., and maintain the temperature of said transport mechanism between about 500° F. and about 600° F.; and,
(xiv) said vestige has a length of less than about 0.090 inches.

3. The apparatus according to claim 2, wherein:
(a) said cylindrical portion of said gate has a diameter of about 0.98 inches;
(b) said side wall of said frusto-conical portion of said gate forms an angle of about 45° to said longitudinal axis;
(c) said gate has an overall axial length of about 0.050 inches.
(d) said cylindrical portion of said gate has an axial length of about 0.010 inches.
(e) said frusto-conical portion of said gate has an axial length of about 0.040 inches.
(f) said axial spacing between said discharge orifice and said inlet orifice of said gate is about 0.040 inches;
(g) said thermal conductivity of said bushing is about 130 W/(M° C.);
(h) said distal end of said bushing has a diameter of about 0.360 inches;
(i) said discharge orifice has a diameter of about 0.098 inches;
(j) said exterior surface of said bushing tapers adjacent to said distal end at an inwardly pointed angle to the longitudinal axis of about 55°;
(k) said diameter of said proximal portion of said bushing passageway is about 0.375 inches.
(l) said radius of said arc of said curved side wall of said inner portion of said first cavity is about 0.328 inches centered on said longitudinal axis about 0.350 inches outwardly from said joinder of said cylindrical and said frusto-conical portions of said gate; and,
(m) said inner end of said first cavity has a diameter of about 0.170 inches.

4. The apparatus according to claim 2, wherein said tapered portion of said exterior surface of said bushing defines an outwardly curved arc.

5. The apparatus according to claims 2, wherein said inner portion of said first cavity further defines a frusto-conical portion adjacent said inner end of said first cavity, said frusto-conical portion having a side wall disposed at an inwardly pointed angle to said longitudinal axis of between about 30° and about 60° and mating with said curved side wall.

6. The apparatus according to claim 5, wherein said side wall of said frusto-conical portion of said inner portion of said first cavity is disposed at an inwardly pointed angle to said longitudinal axis of about 55°.

7. The apparatus according to claim 2, wherein said bushing comprises a copper alloy.

8. The apparatus according to claim 7, wherein said bushing is coated with nickel and said copper alloy is berylium copper.

9. The apparatus according to claim 1, wherein said bushing comprises a main bushing body, a tip and an bushing insert;

said main bushing body defining an end, and first and second counterbores extending into said end surrounding said longitudinal passageway in said bushing;

said first counterbore having a first inner end, a first diameter larger than the diameter of said longitudinal passageway, and a first axial length;

said second counterbore having a second inner end, a second diameter smaller than said first diameter of said first counterbore but larger than the diameter of said longitudinal passageway, and a second axial length longer than said first axial length;

said tip comprising a cylindrical structure having a first end, a second end, an outer surface, an annular flange extending radially outwardly from said outer surface adjacent said first end, and an inner diameter substantially the same as said second diameter of said second counterbore; said outer surface being adapted to fixedly engage said first counterbore such that said second end engages said first inner end of said first counterbore and said flange is located in closely spaced relation to said end of said main bushing body; and said bushing insert comprising a substantially cylindrical structure having a proximal end, a distal end, a first portion adjacent said proximal end having an external diameter substantially equal to said second diameter of said second counterbore and an axial length substantially equal to the difference in axial length between said first and said second counterbores, a second portion having an axial length longer than said first axial length located adjacent said distal end and joined to said first portion, and an axial passageway therethrough which tapers radially inwardly as it extends from said proximal end to said distal end of said bushing insert; said first portion of said bushing insert being adapted to fixedly engage said second counterbore such that said proximal end of said bushing insert abuts said second inner end of said second counterbore and said second portion of said bushing insert extends substantially axially through, and outwardly of, said tip in radially spaced relationship thereto.

\* \* \* \* \*